Wm Rayhill's Corn Planter
73649
PATENTED
JAN 21 1868
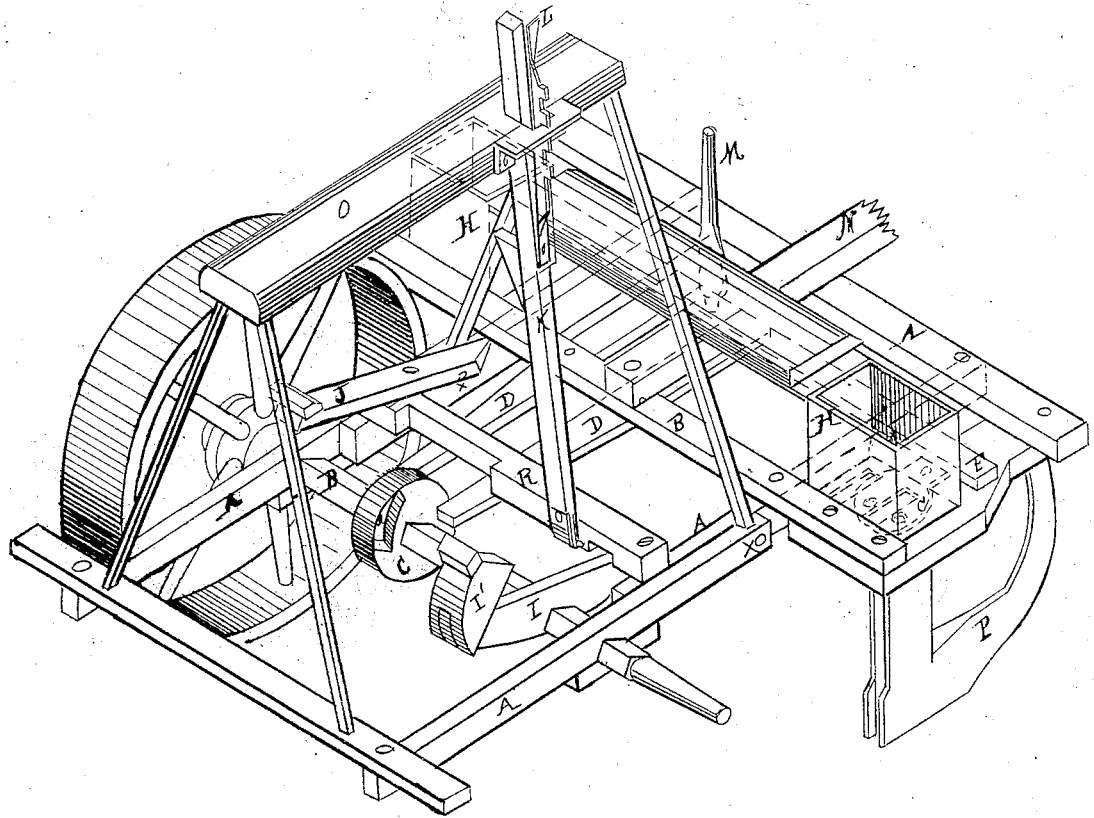
Witnesses
Inventor
Wm Rayhill

United States Patent Office.

WILLIAM RAYHILL, OF PANA, ILLINOIS.

Letters Patent No. 73,649, dated January 21, 1868.

---

IMPROVEMENT IN CORN-PLANTERS.

---

*The Schedule referred to in these Letters Patent and making part of the same.*

---

TO ALL WHOM IT MAY CONCERN:

Be it known that I, WILLIAM RAYHILL, of Pana, in the county of Christian, and in the State of Illinois, have invented certain new and useful Improvements in Corn-Planters; and do hereby declare that the following is a full, clear, and exact description thereof, reference being had to the accompanying drawings, and to the letters of reference marked thereon.

In the annexed drawings, making part of this specification, A and A' represent two frames, which are pivoted together at $x\ x$. The frame A' is supported upon the axle B, and said axle is provided with the usual wheels for bearing it. The forward part of frame A is supported upon the runners P, its rear end being supported by the frame A'. H H represent two seed-hoppers, which are secured upon frame A, and over the runners P. These hoppers are provided, at their bottoms, with suitable seed-apertures, and beneath these apertures are the seed-slides G, seen in dotted line. These seed-slides are pivoted beneath the hoppers, and also at their outer ends, to the cross-bar F. Upon axle B is a wheel, C, and upon the sides of this wheel are cams $e$. These cams operate upon the rear ends of two bars D D, which are parallel to each other, and which are pivoted, near their centres, to a bar, E, of frame A, and at their forward ends, to the slide-bar F. As there is a cam, $e$, upon each side of wheel C, and as bars D straddle a portion of said wheel, the cams operate said bars laterally, being so arranged as to operate them alternately also. Thus, it will be seen, that when the axle B revolves, the slide-bar F is given a reciprocating motion, and that it works the seed-slides G, so as to discharge the seed between the two parts of the runner P. R represents a cross-piece, on the rear of the frame A, and to which a notched bar, K, is hinged. This notched bar stands vertically, passing through a slot or opening in the seat O. The notches of this bar catch upon a plate in the seat, for stationing the bar, and consequently the frame, in any desired position. I represents a lever, surrounding the axle B, with its forward end resting under the rear of frame A, said lever having a foot-piece, I', by means of which it is operated. By bearing down upon this lever, the rear of frame A is elevated. J represents a standard upon frame A, which is provided with a foot-piece, for depressing the rear of frame A. M represents a vertical hand-lever, the lower end of which is connected to bar F. By means of this lever, this bar can be operated without the use of the bars D D, if desirable.

The slides G may be operated oftener than once at each revolution of wheel C, by securing two or more cams on each side of it. The driver, who sits upon the seat O, regulates the depth to which the runners are made to enter the earth.

Having thus fully described my invention, what I claim as new, and desire to secure by Letters Patent, is—

The bars D D, wheel C, with its cams, slide F, and seed-slides G G of the hoppers, arranged and used with the frames A A', standard J, bar K, and lever I, substantially as and for the purpose set forth.

In testimony that I claim the foregoing, I have hereunto set my hand, this 24th day of September, 1867.

WILLIAM RAYHILL.

Witnesses:
   WM. J. JORDAN,
   O. R. COUGILL.